L. SKOK.
METAL CASING FOR LEAF SPRINGS.
APPLICATION FILED NOV. 30, 1917.

1,284,800.

Patented Nov. 12, 1918.
2 SHEETS—SHEET 1.

Inventor
Laurence Skok
By Bates & Macklin
Attorneys.

L. SKOK.
METAL CASING FOR LEAF SPRINGS.
APPLICATION FILED NOV. 30, 1917.

1,284,800.

Patented Nov. 12, 1918.
2 SHEETS—SHEET 2.

INVENTOR,
Lawrence Skok,
BY Bates & Macklin,
ATT'YS.

UNITED STATES PATENT OFFICE.

LAWRENCE SKOK, OF CLEVELAND, OHIO.

METAL CASING FOR LEAF-SPRINGS.

1,284,800.  Specification of Letters Patent.  Patented Nov. 12, 1918.

Application filed November 30, 1917. Serial No. 204,510.

*To all whom it may concern:*

Be it known that I, LAWRENCE SKOK, residing at Cleveland, in the county of Cuyahoga and State of Ohio, have invented a certain new and useful Improvement in Metal Casings for Leaf-Springs, of which the following is a full, clear, and exact description, reference being had to the accompanying drawings.

The invention relates to improvements in flexible metal casings for laminated springs, designed to extend longitudinally of the spring. The purpose of such casings is to provide means for insuring adequate lubrication and preventing the waste thereof by retaining lubricant within the spring, and also to protect the spring from dust and dirt.

The objects of this invention are to provide such a casing which shall be simple in construction, capable of being cheaply manufactured, adapted to quite completely inclose the spring in a dust and lubricant tight manner, while being capable of ready application to the spring.

The method of attaining the above and other objects will become apparent in the following description which refers to the drawings. The essential characteristics of this invention are summarized in the claims.

Figure 1:
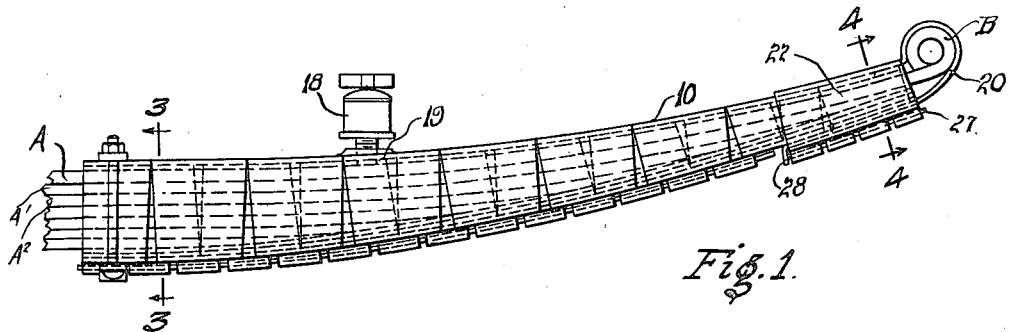
Figure 2:
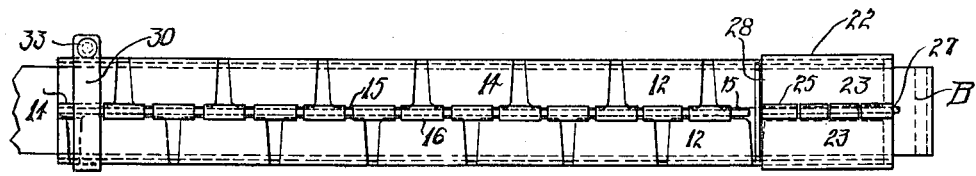
Figure 3:
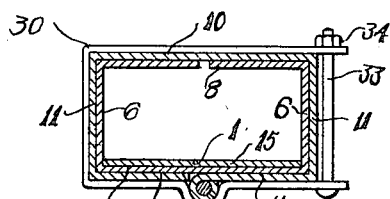
Figure 4:
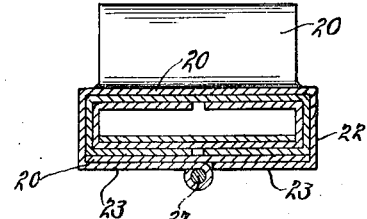
Figure 5:
Figure 6:
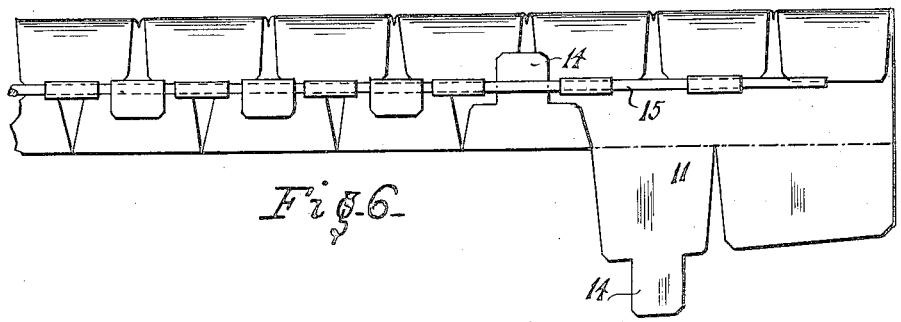
Figure 7:
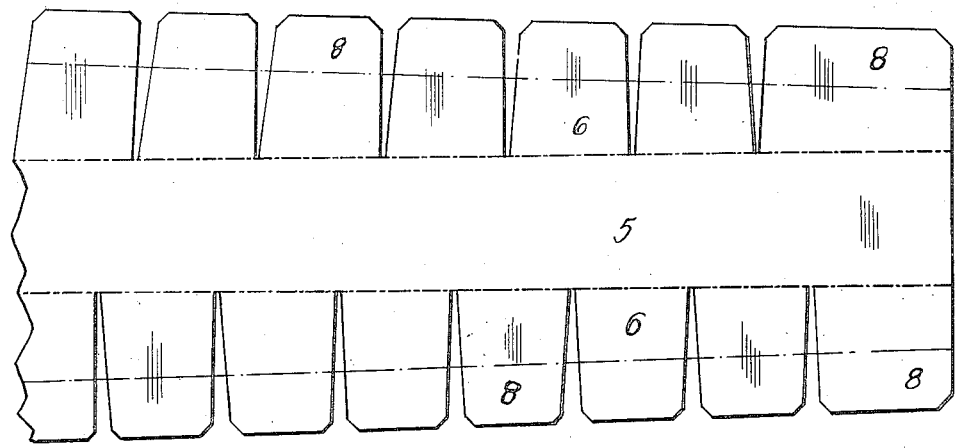
Figure 8:
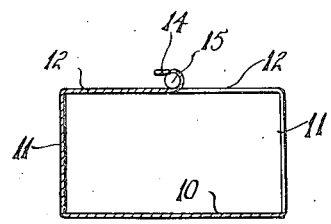
Figure 9:
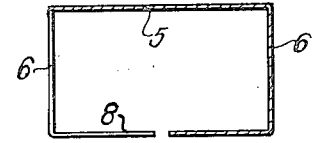

In the drawings, Figure 1 is a side elevation of a portion of a quarter or semi-elliptical leaf-spring in the nature of a side elevation of the same with my improved casing mounted thereon; Fig. 2 is a bottom plan of the casing and spring as shown in Fig. 1; Fig. 3 is a transverse section through the casing taken substantially on the line 3—3 of Fig. 1; Fig. 4 is a similar section looking toward the end or eye of the spring and taken substantially on the line 4—4 of Fig. 1; Fig. 5 is an end view of the casing portion surrounding the eye of the spring; Fig. 6 is a detail in the nature of a plan of a portion of the outer casing member illustrating the method of constructing and assembling the same; Fig. 7 is a plan of the blank for forming the inner casing. Figs. 8 and 9 are transverse sections through the outer and inner casing members respectively showing them inverted.

The present invention is in the nature of an improvement of flexible metal casings for laminated springs such as form the subject matter for Patent No. 1,235,211 to B. B. Leustig, granted July 31, 1917. In that patent the casing was formed by two superimposed leaves at opposite sides of the laminated springs, each of said leaves having integral flanges longitudinally separated into short lengths and extending across the sides of the spring, thus forming in effect two members each extending around three sides of the spring with the result that narrow sides of the spring were inclosed by four layers of overlapping pieces. In the present invention there are in effect two members, each having a strip lying along the side of the spring with leaves or ears extending across the edges of the spring and overlapping on the opposite side. Thus when using my casing the spring is substantially completely inclosed by two members, each embracing four sides of the spring.

Describing the parts in detail by the use of reference characters, A indicates a laminated spring of the usual construction, for automobiles and the like, having one member extending the full length of the spring and terminating in an eye B, while the successive members A', A², etc., are shorter and terminate at successively longer distances from the end of the spring. My complete casing comprises preferably a strip 1 substantially the width of the spring and extending along over the ends of the shorter leaves or laminations and terminating adjacent the eye B. The inner casing member has a strip or body member 5 similar to the strip 1, but formed integral with laterally extending flanges cut into separate leaves, leaving narrow spaces between them so that when such leaves 6 are bent upwardly across the edges of the spring leaves and inwardly to overlap the opposite sides, as at 8, they may permit free flexing of the spring while embracing four sides of the same.

The outing casing member has a strip 10 lying along in contact with the portions 8 of the inner casing member and provided with integral flanges 11, separated by wedge-shaped cuts and adapted to extend across opposite edges of the spring and overlap, as at 12, the side of the spring opposite the strip 10. To secure the outer casing, and incidentally the inner casing and the strip 1 in position, I find it convenient to provide the flange members 11 with extended lips 14 which may be curled around a small flexible rod or wire 15.

From examination of Fig. 6 it will be seen that this rod may conveniently be held by the eyes or lips 14 of one set of flanges while the lips 16 of the other set may be conveniently passed beneath the rod and curled over the same (as indicated in Fig. 9) to complete assembling and secure the parts as shown in Figs. 1 and 2.

At 18 is shown a lubricant cup preferably of the type having means for forcing lubricant to the bearing surfaces, and shown as having its stem 19 extending through the outer casing member 10 and into the upper leaf A. Lubricant forced into the casing finds its way around within the inner casing and between the laminations of the spring, while the staggered overlapping flanges minimize the loss of the lubricant.

The eye portion B, may be inclosed by a strip 20, looping around the same and formed substantially the full width of the spring and extending along the spring for a short distance overlapping the outer portion of the outer casing, just described. Thus the strip 20 lies upon the outer end of the strip 10 and at this overlapping portion has integral therewith, a flange 22, extending across the side of the other casing member and then inwardly over the end leaves 12 as at 23. These overlapping portions meeting substantially at the center of the spring are here provided with lips 25 alternately integral with the opposite members 23 and curled around a pin 27, in alinement with the retaining wire 15. The strip 20 is shown as extending above the overlapping members 23 and turned downwardly as at 28, at its inner end, to hold the looping portion of this strip tightly in engagement with the eye B.

The casing may be secured to the spring and held against longitudinal movement by any suitable means. I have shown, for example, a U-shaped strip 30 looping at 31, beneath the fastening lips 14 and extending outwardly past the edge of the casing on the spring, the overlapping portions receiving a bolt 33, having a nut 34, adapted to tighten this securing member in position.

Having thus described my invention what I claim is:

1. A casing for a laminated spring comprising a flexible metal strip having longitudinally separated short flanges integral with the strip, said strip being adapted to lie along the spring with said flanges extending across the edges of the laminations and bent toward each other at the side opposite said strip and there having narrower extensions, and means for connecting said extensions to hold them in such embracing position.

2. A casing for a laminated spring comprising a flexible metal strip having longitudinally separated short flanges integral with the strip, said strip lying along a spring and said flanges extending across the edges of the laminations and bent inwardly at the side opposite said strip and a longitudinally extending rod around which said extensions may be curved, for holding such flanges in embracing position.

3. A casing member for a laminated spring comprising a flat flexible metal strip, having integral therewith at each side laterally extending flange ears, longitudinally separated, those on one side of the strip being off-set or staggered with relation to those on the opposite side, said flange ears being adapted to extend across the edges of the spring leaves and be bent inwardly over the outside leaves whereby the casing member thus formed may embrace four sides of the spring, extensions formed on the flange ears integral therewith and adapted to be turned back toward the ears, and a longitudinal rod embraced by said extensions.

In testimony whereof, I hereunto affix my signature.

LAWRENCE SKOK.